US007885488B2

(12) United States Patent
Nam et al.

(10) Patent No.: US 7,885,488 B2
(45) Date of Patent: Feb. 8, 2011

(54) IMAGE PROCESSING APPARATUS, METHOD AND MEDIUM

(75) Inventors: Dong-Kyung Nam, Yongin-si (KR); Ho-joon Yoo, Yongin-si (KR); Sun-gi Hong, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1009 days.

(21) Appl. No.: 11/713,701

(22) Filed: Mar. 5, 2007

(65) Prior Publication Data

US 2008/0002915 A1    Jan. 3, 2008

(30) Foreign Application Priority Data

Jun. 30, 2006   (KR) ...................... 10-2006-0060847

(51) Int. Cl.
*G06K 9/32*   (2006.01)
(52) U.S. Cl. ........................... 382/300; 345/606
(58) Field of Classification Search ............... 345/475, 345/606–610, FOR. 103; 348/538, E13.065, 348/E7.012; 358/525, FOR. 166; 375/E7.188, 375/E7.248, E7.25; 381/94.4; 382/300; 386/50, 73; 700/189, 252; 702/169; 704/265; 708/290, 313, 847
See application file for complete search history.

(56) References Cited

U.S. PATENT DOCUMENTS 5,625,768 A * 4/1997 Dye ........................... 345/441

6,631,216 B2   10/2003 Hieda et al.
2002/0001409 A1 * 1/2002 Chen et al. .................. 382/167
2004/0027260 A1   2/2004 Koyanagi

FOREIGN PATENT DOCUMENTS

| JP | 11-53530 | 2/1999 |
| KR | 2000-0001888 | 1/2000 |
| KR | 2003-0028198 | 4/2003 |
| KR | 2004-0065806 | 7/2004 |
| KR | 2005-0047714 | 5/2005 |

OTHER PUBLICATIONS

PCT Notification of Transmittal of the International Search Report and the Written Opinion of the international Searching Authority, or The Declaration dated Aug. 8, 2007 (in English).

* cited by examiner

*Primary Examiner*—Bhavesh M Mehta
*Assistant Examiner*—Gregory F Cunningham
(74) *Attorney, Agent, or Firm*—Staas & Halsey LLP

(57) ABSTRACT

Provided are an image processing apparatus, method and medium, more particularly, an image processing apparatus, method and medium which perform interpolation such that a pixel value in each pixel region included in a digital image and an average value of interpolation data extracted using a predetermined interpolation method in the pixel region are equal. The image processing apparatus includes an accumulative addition unit to sequentially integrate values of pixels included in an image, an interpolation unit to interpolate the integrated pixel values, and an accumulative subtraction unit to perform differentiation at a predetermined position of the interpolated pixel values.

24 Claims, 20 Drawing Sheets

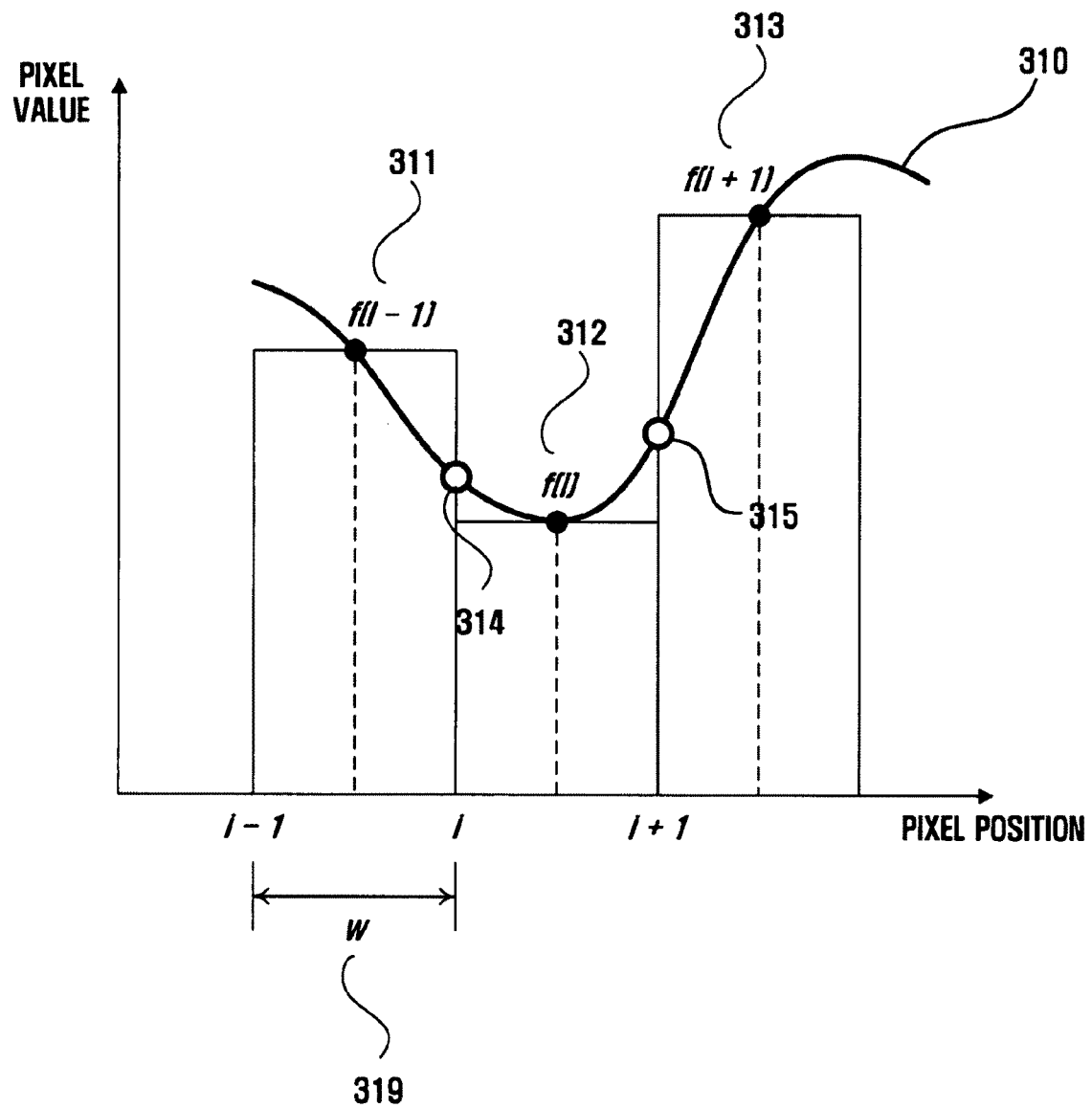

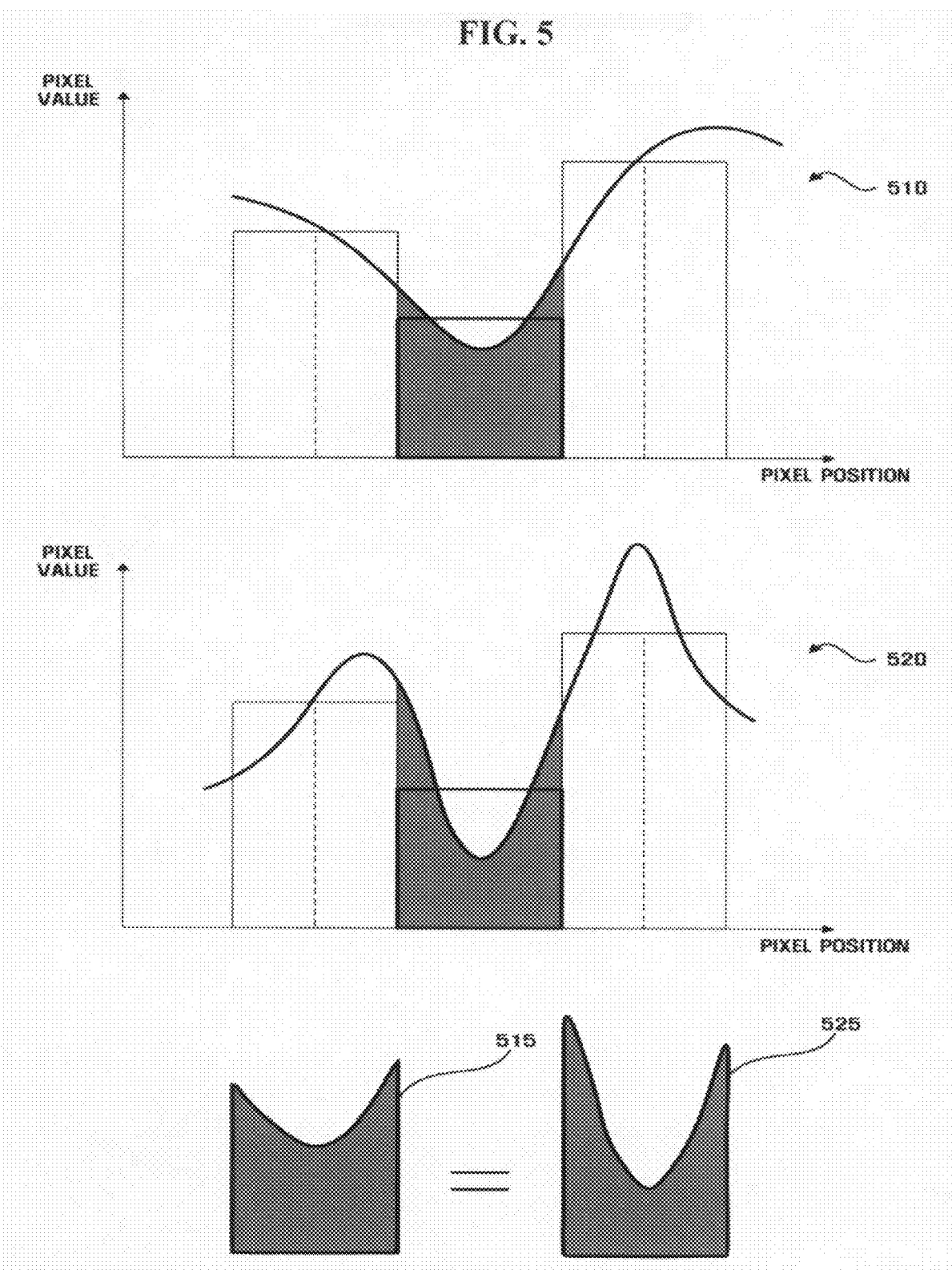

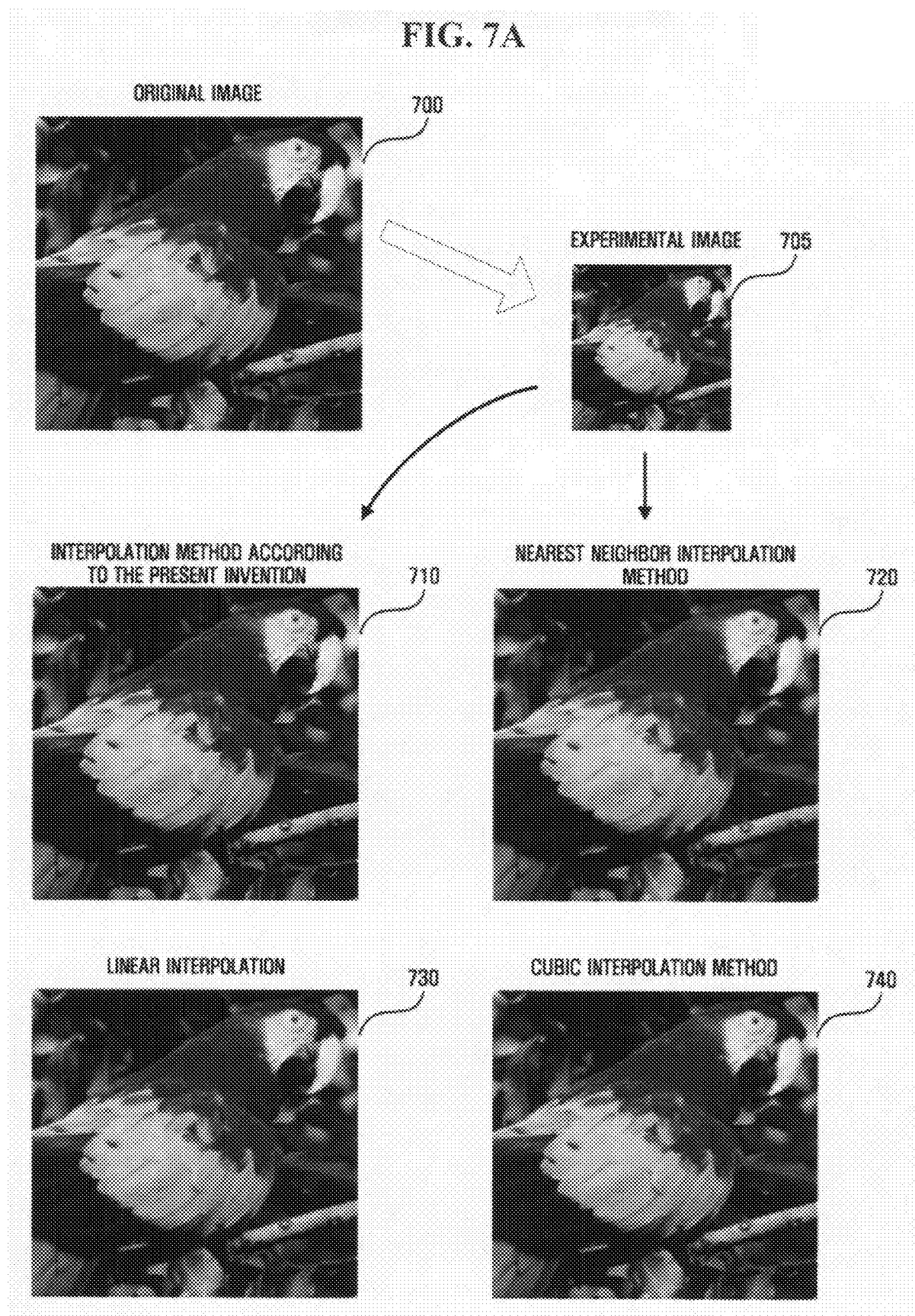

|  | PIXEL ERROR | BRIGHTNESS | RESOLUTION |
|---|---|---|---|
| ORIGINAL IMAGE |  | 81.430252 | 4.395253 |
| INTERPOLATION METHOD ACCORDING TO PRESENT INVENTION | 3.082297 | 81.432207 | 2.817612 |
| CUBIC INTERPOLATION METHOD | 5.139426 | 81.332571 | 2.086718 |
| LINEAR INTERPOLATION METHOD | 5.317659 | 81.334306 | 1.997724 |
| NEAREST NEIGHBOR INTERPOLATION METHOD | 4.706407 | 81.487221 | 1.997724 |

FIG. 7C
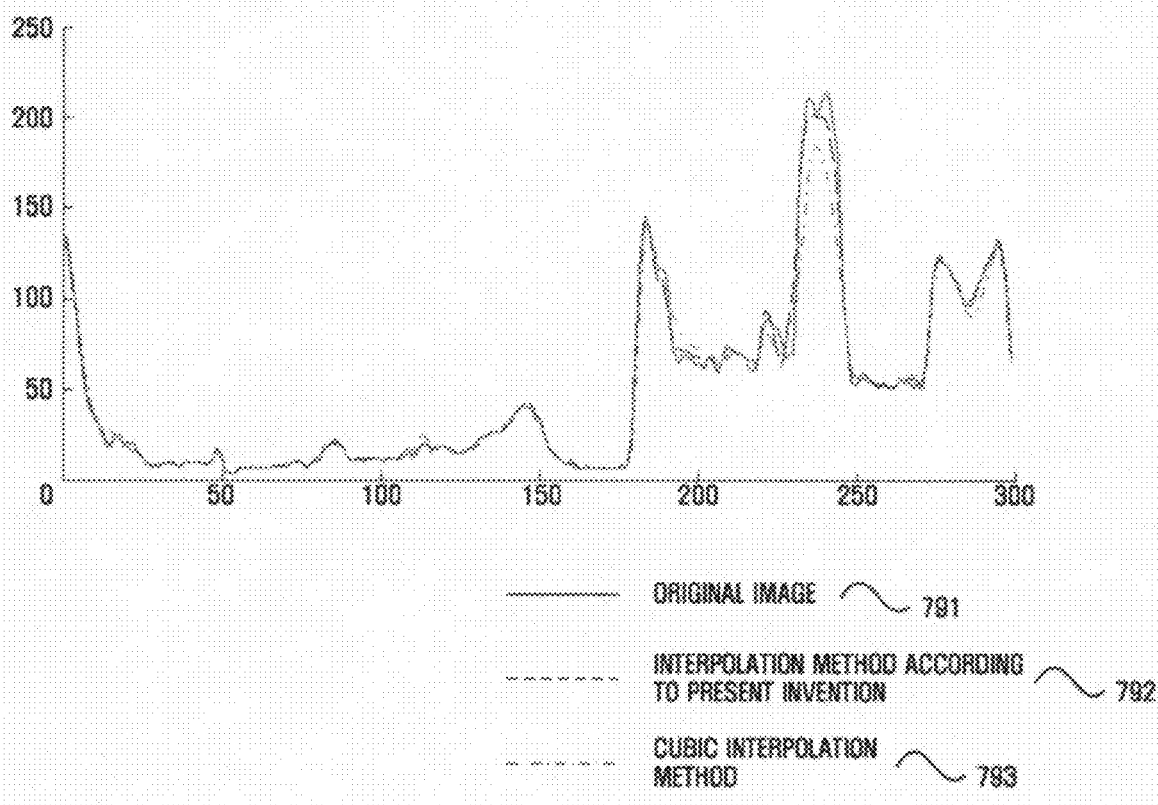

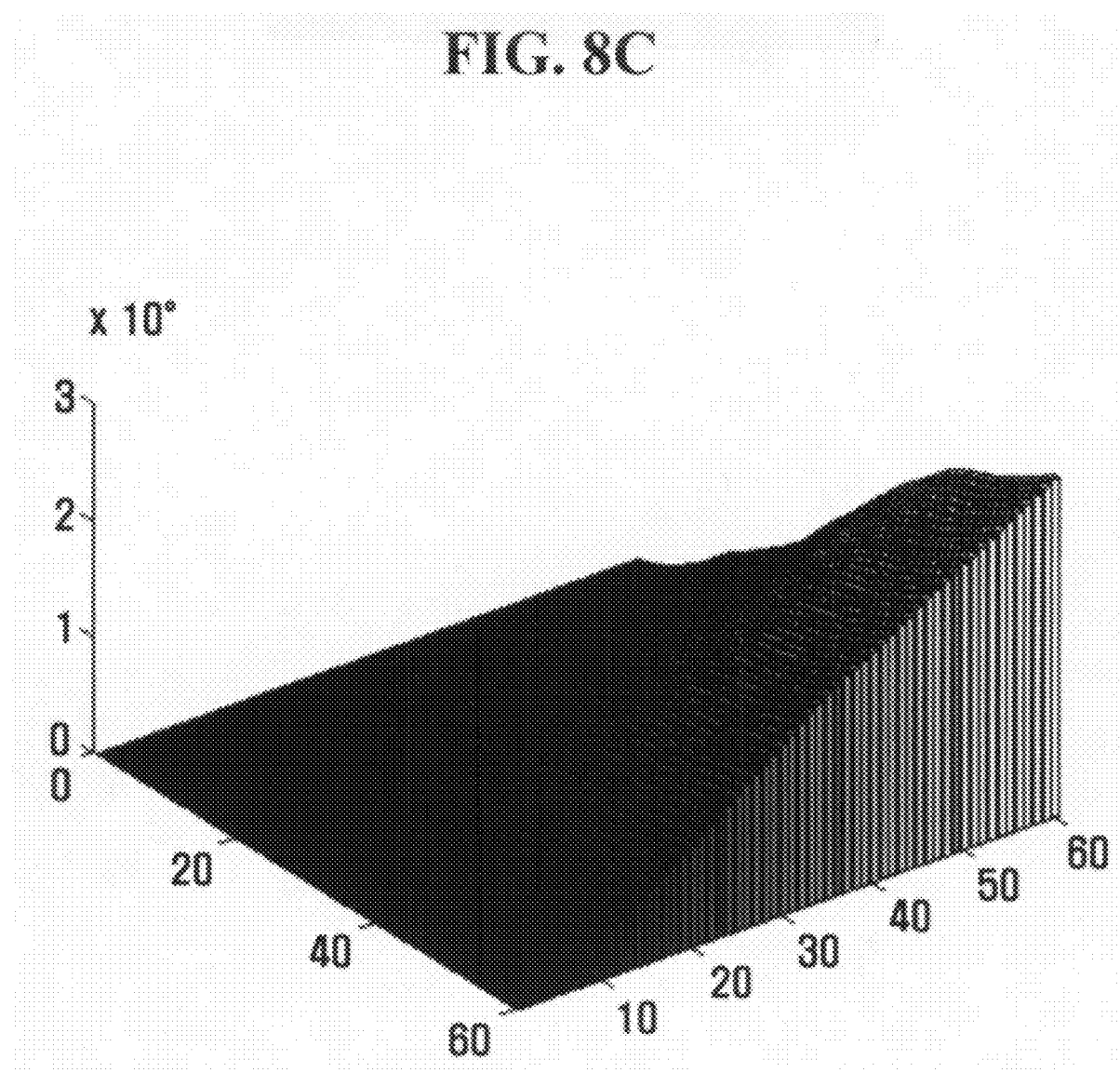

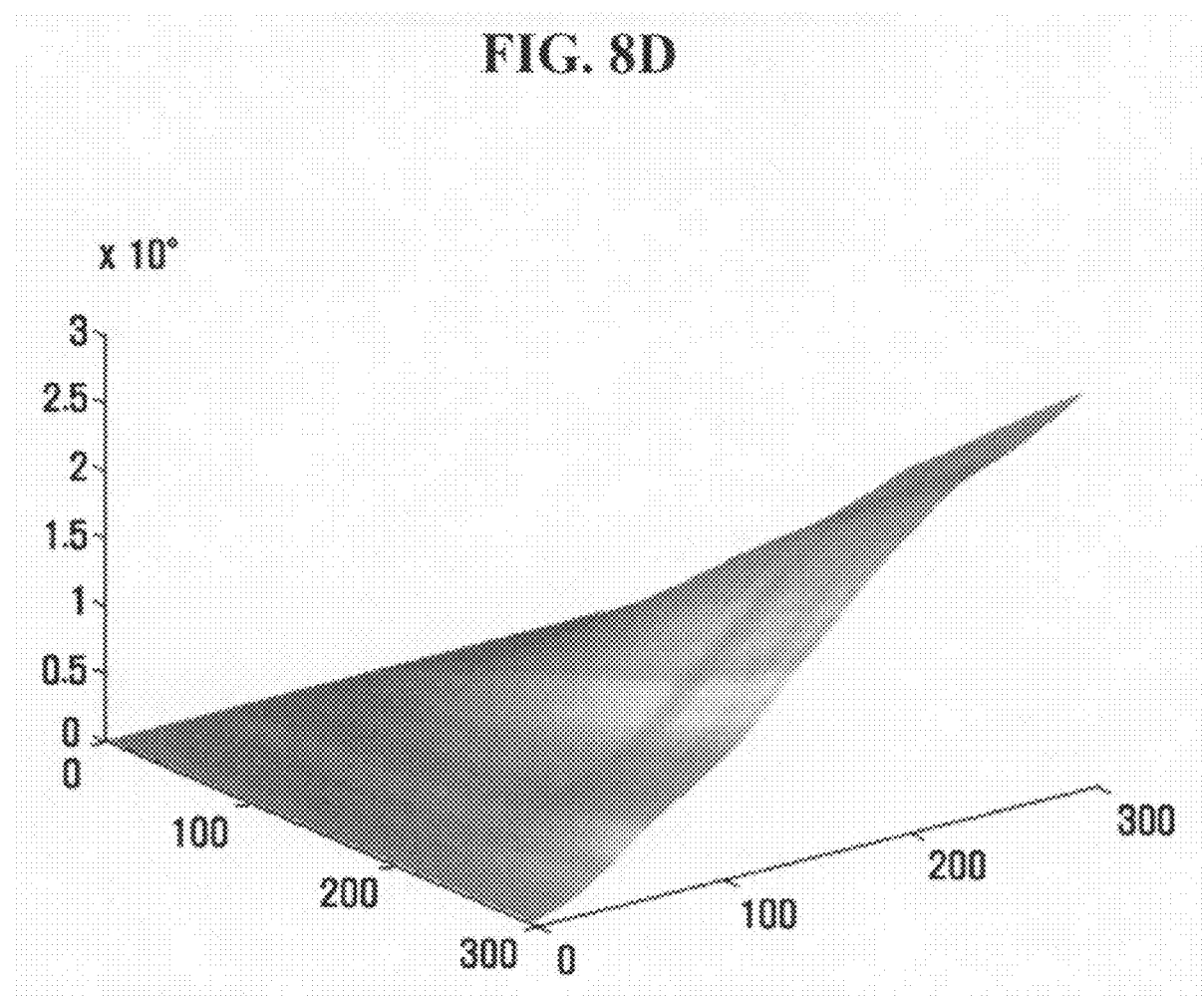

IMAGE PROCESSING APPARATUS, METHOD AND MEDIUM

CROSS-REFERENCE TO RELATED APPLICATIONS

This application claims priority from Korean Patent Application No. 10-2006-0060847 filed on Jun. 30, 2006 in the Korean Intellectual Property Office, the disclosure of which is incorporated herein by reference in its entirety.

BACKGROUND

1. Field

One or more embodiments of the present invention relate to an image processing apparatus, method and medium, and more particularly, to an image processing apparatus, method and medium which perform interpolation such that a pixel value in each pixel region included in a digital image, and an average value of interpolation data extracted using a predetermined interpolation method in the pixel region are equal.

2. Description of the Related Art

Digital signal processing techniques have gradually replaced analog signal processing techniques. Today, many aspects of our lives are being digitalized, and such digitalization is readily apparent in the field of imaging. For example, analog televisions (TVs) are being replaced by digital TVs, and analog cameras are being replaced by digital cameras. Accordingly, many studies are being conducted on digital image processing, in particular, image interpolation.

Conventional image interpolation techniques include, as examples, a linear interpolation technique, a nearest neighbor interpolation technique, a cubic interpolation technique, and a cubic-spline interpolation technique. In these techniques, all adjacent pixels are regarded as points and are interpolated accordingly.

However, in the case of a digital image, each pixel may be regarded as a region. When a subject is photographed using an image input apparatus such as a digital camera or a scanner, the image input apparatus digitalizes the amount of light collected by a lens using a light-receiving device such as a charge coupled device (CCD), for example. Therefore, each pixel has an average value of brightness in a certain area through the lens. The same is true for a graphic image generated using a computer.

For this reason, when image data is interpolated using a conventional point-based interpolation technique, unintended errors and distortions may occur. One of the major effects of such distortions on the quality of an image is that a restored image may be smoother than a real image. Hence, the restored image may blur.

A digital image processing technology, in particular, a digital image interpolation technology, may be used for image output apparatuses such as TVs and monitors, printing apparatuses such as printers, and image input apparatuses such as cameras and scanners, for example. In addition, the digital image processing technology may be utilized in diverse fields including military, medicine, broadcasting, industry and household appliances. As users become more sophisticated, improved quality becomes increasingly important. Accordingly, an ability to provide faster and higher-quality images has become an important factor in the field of digital image processing.

In this regard, a method of extracting a high-quality interpolated image using given image information, and without requiring significant computation time, is required.

SUMMARY

One or more embodiments of the present invention sequentially integrate a series of digital image data, differentiate a graph generated as a result of the integration, and interpolate a corresponding digital image.

Additional aspects and/or advantages of the invention will be set forth in part in the description which follows and, in part, will be apparent from the description, or may be learned by practice of the invention.

To achieve at least the above and/or other aspects and advantage, embodiments of the present invention include an image processing apparatus including an accumulative addition unit to sequentially integrate values of pixels included in an image, an interpolation unit to interpolate the integrated pixel values, and an accumulative subtraction unit to perform differentiation at a predetermined position of the interpolated pixel values.

To achieve at least the above and/or other aspects and advantage, embodiments of the present invention include an image processing method including sequentially integrating values of pixels included in an image, interpolating the integrated pixel values, and performing differentiation at a predetermined position of the interpolated pixel values.

To achieve at least the above and/or other aspects and advantage, embodiments of the present invention include at least one medium comprising computer readable code to control at least one processing element to implement an image interpolation method including sequentially integrating values of pixels included in an image, interpolating the integrated pixel values, and performing differentiation at a predetermined position of the interpolated pixel values.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 3A and 3B illustrate the result of a conventional interpolation method and the result of an interpolation method, according to an embodiment of the present invention, respectively;

FIG. 5 illustrates interpolation results having different slopes, according to an embodiment of the present invention;

FIGS. 7A through 7C illustrate an image processed, according to an embodiment of the present invention, and the results of processing the image; and FIGS. 8A through 8F illustrate an image processed, according to an embodiment of the present invention, and the process of processing the image.

DETAILED DESCRIPTION OF EMBODIMENTS

Figure 1:
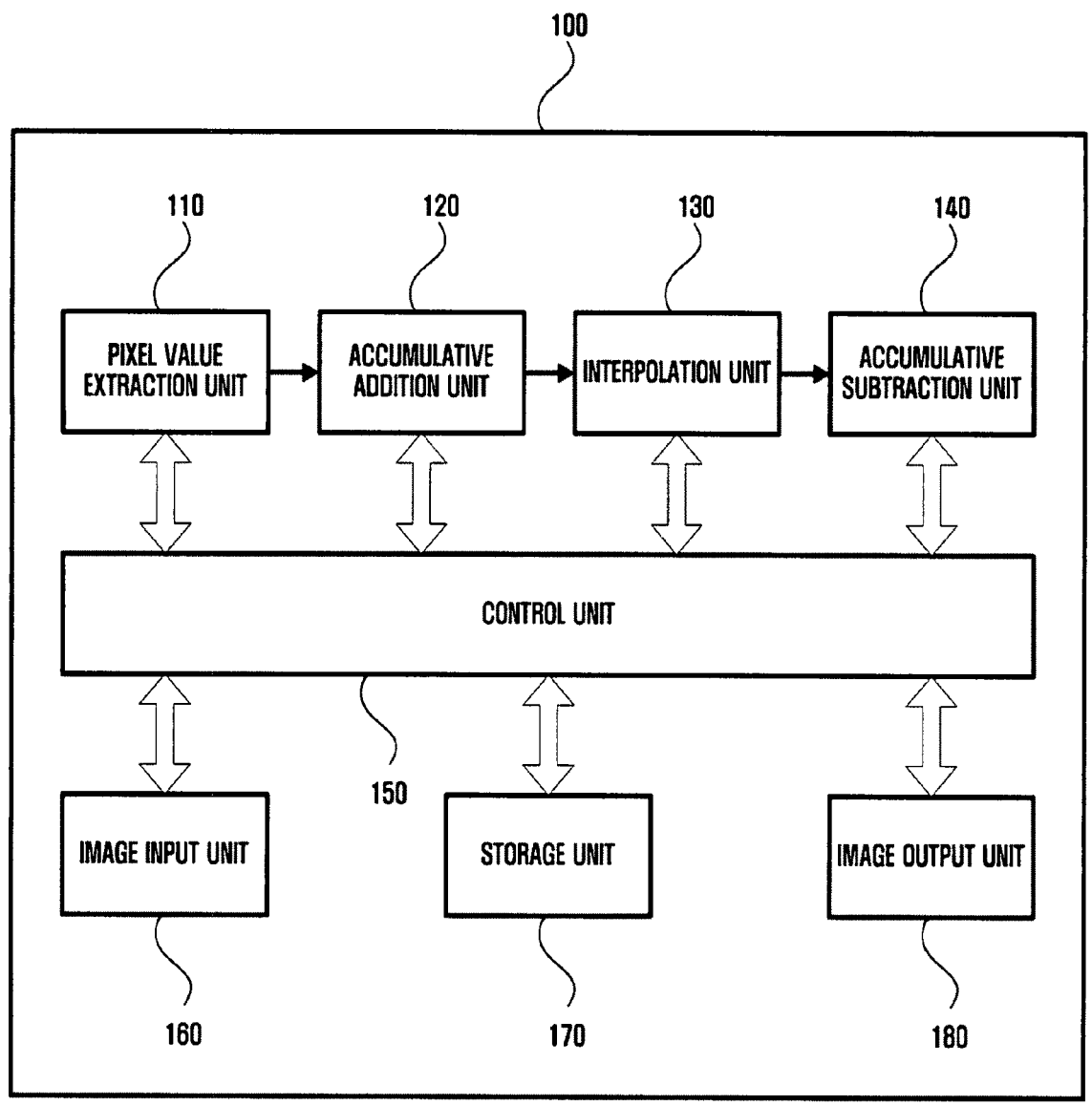
FIG. 1 illustrates an image processing apparatus, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 illustrates an image processing apparatus 100 according to an embodiment of the present invention. The image processing apparatus 100 may include a pixel value extraction unit 110, an accumulative addition unit 120, an interpolation unit 130, an accumulative subtraction unit 140, a control unit 150, an image input unit 160, a storage unit 170, and an image output unit 180, although additional or other units may also be included.

The image input unit 160 may receive an image. The image input to the image input unit 160 may be an analog image or a digital image. If the input image is an analog image, the image input unit 160 may convert the input analog image into a digital image.

The pixel value extraction unit 110 may sequentially extract values of pixels included in the image input to the image input unit 160. For example, starting from a value of a pixel located at the top left corner of a pixel array, the pixel value extraction unit 110 may sequentially extract values of pixels one at a time, from left to right in the pixel array.

A pixel value may vary according to a color model of the image input to the image input unit 160. Therefore, the pixel value may include color intensity according to a red, green and blue (RGB) model, a cyan, magenta, yellow and black (CMYK) model, a commission internationale de l'Eclairage (CIE) LAB model, a CIE XYZ model, or a CIE LUV model, as examples only.

The accumulative addition unit 120 may accumulate pixel values extracted by the pixel value extraction unit 110 and may add the accumulated pixel values. For example, if the color distribution of the input image is black and the extracted pixels values are 100, 125 and 200, sequentially, the pixel values accumulated by the accumulative addition unit 120 are 100, 225, and 425, sequentially.

In a physical sense, the accumulative addition unit 120 may convert a point-based pixel into a region-based pixel. In other words, the accumulative addition unit 120 may convert a region (hereinafter, referred to as a pixel region) occupied by one pixel from a point basis to a region basis. To accumulate analog signals, continuous adding of each analog signal is used. However, since digital image data is discrete, the accumulative addition unit 120 may integrate the digital image data by accumulatively adding each data (pixel value).

The pixel values accumulated by the accumulative addition unit 120 may be temporarily stored. Therefore, the image processing apparatus 100 may include the storage unit 170, for example.

The storage unit 170 may be a module to and from which information can be input and output, such as a hard disk, a flash memory, a compact flash (CF) card, a secure digital (SD) card, a smart media (SM) card, a multimedia card (MMC), and a memory stick, for example. The storage unit 170 may be included in the image processing apparatus 100 or in a separate apparatus.

The interpolation unit 130 may interpolate the integration result of the accumulative addition unit 120 using a predetermined interpolation method, for example. Therefore, there may be a plurality of different interpolation data in a pixel region. The interpolation unit 130 may interpolate the integration result such that a pixel value in a pixel region where a particular pixel exists is equal to an average value of the interpolation data in the pixel region. The predetermined interpolation method may be, for example, a linear interpolation method, a quadratic interpolation method, a cubic interpolation method, a Gaussian interpolation method, a neural network interpolation method, or a support vector machine interpolation method.

A pixel is a digitalized point, and only one pixel value can be mapped to a region where a pixel exists, i.e., a pixel region. However, the interpolation result of the interpolation unit 130 may vary even within a pixel region. In other words, if pixels sequentially extracted are one-dimensionally listed and arranged at intervals, each corresponding to a pixel section, the size of a pixel region calculated by multiplying an interval between pixels by a pixel value is equal to an accumulated value of the interpolation result at the interval. The interpolation result will be described in greater detail later with reference to FIG. 2.

The accumulative subtraction unit 140 may perform differentiation at a predetermined position of the interpolation result of the interpolation unit 130, for example. In other words, the accumulative subtraction unit 140 may convert the region-based pixel back into the point-based pixel.

Such reverse conversion on the analog signal is performed by differentiating space. However, since digital image data is discrete data, the accumulative subtraction unit 140 may differentiate the digital image data by accumulatively subtracting each data, for example.

The position of a pixel value between pixels may vary according to an enlargement rate of an image. For example, if horizontal and vertical lengths of an image are enlarged two times, a pixel value is mapped to the center of a corresponding pixel. If the horizontal and vertical rates of the image are enlarged three times, the pixel value may be mapped to a position corresponding to ⅓ and ⅔ of the pixel.

A pixel value exceeding a predetermined threshold range of pixel values may be produced as a result of the reverse conversion. In this case, the accumulative subtraction unit 140 may determine the pixel value exceeding the threshold range to be within the threshold value. The form of the interpolation result of the interpolation unit 130 may be determined according to the pattern of pixel values. Therefore, there may be a pixel value exceeding the threshold range. For example, if the threshold range is between 0 and 255, a pixel value obtained after the reverse conversion may be less than 0 or greater than 255. In this case, the accumulative subtraction unit 140 may determine a pixel value less than 0 to be 0 or a pixel value greater than 255 to be 255.

Until one image (one frame in the case of a moving image) is differentiated, a pixel value in each pixel region, and between pixels, may be temporarily stored in the storage unit 170, for example.

The image output unit 180 may display the image converted according to the pixel values extracted by the accumulative subtraction unit 140. The image output unit 180 is a module that may include an image display unit such as a cathode ray tube (CRT), a liquid crystal display (LCD), a light-emitting diode (LED), and a plasma display panel (PDP), for example. The image output unit 180 may display received image information.

The control unit 150 may control data transmission among the pixel value extraction unit 110, the accumulative addition unit 120, the interpolation unit 130, the accumulative subtraction unit 140, the image input unit 160, the storage unit 170 and the image output unit 180, for example, and may control the overall operation of the image processing apparatus 100.

Figure 2:
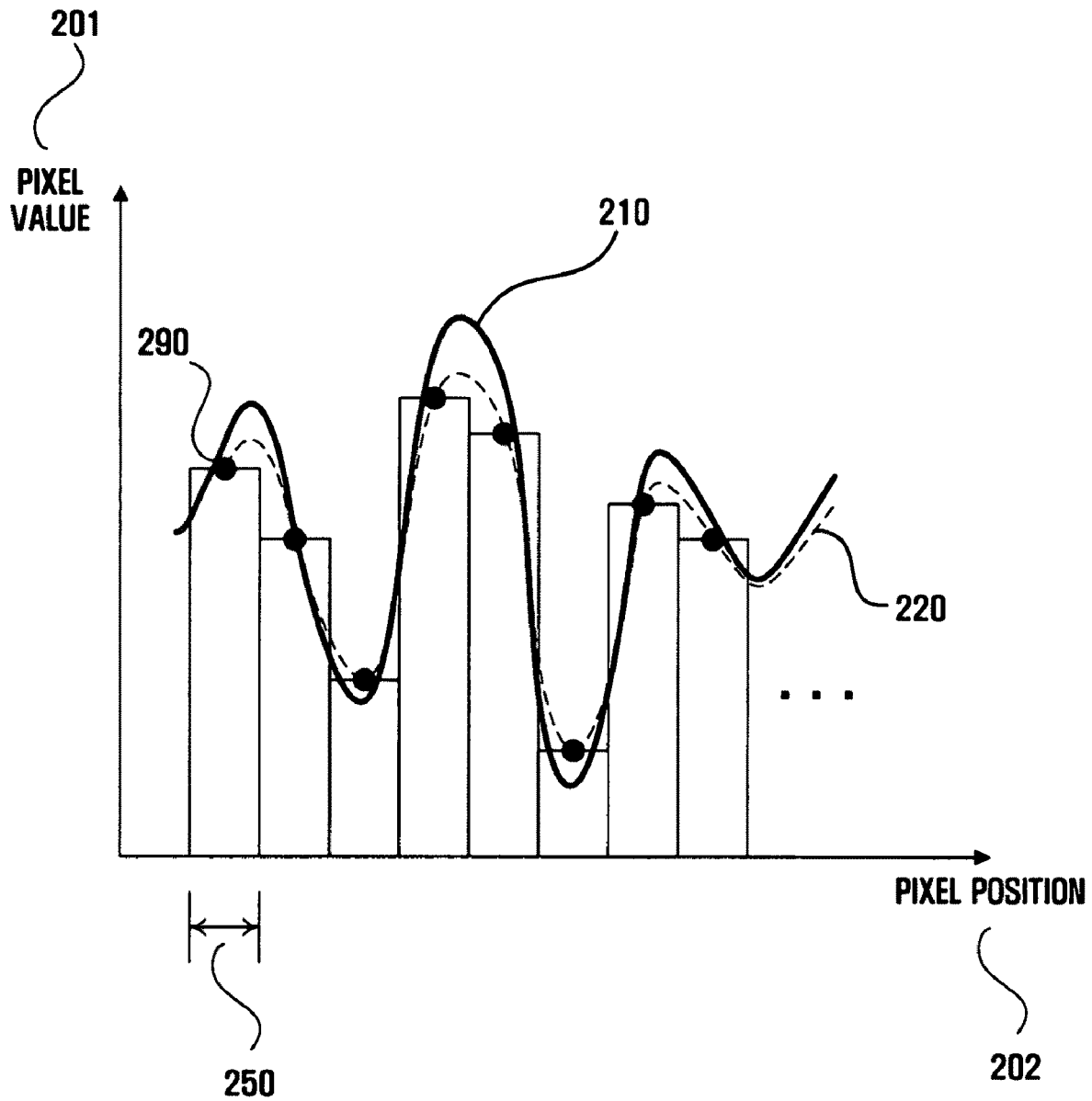
FIG. 2 illustrates interpolation results, according to an embodiment of the present invention.

FIG. 2 illustrates interpolation results, according to an embodiment of the present invention.

If a series of pixels are one-dimensionally arranged, it may be assumed that a horizontal direction of the graph indicates a pixel position 202, and that the width of a pixel region to which a pixel value is mapped, is equal to an interval 250 between pixels, as illustrated in FIG. 2. Here, if a vertical direction of the graph indicates a pixel value 201, each pixel may be illustrated in a rectangular shape as in FIG. 2 since each pixel region can have only one pixel value.

In FIG. 2, a dotted line indicates a result 220 of a conventional cubic interpolation technique. According to the conventional cubic interpolation technique, which in this example is a typical point-based interpolation technique, the result 220 of the cubic interpolation technique passes through each pixel point 290. The pixel point 290 denotes a position, to which a pixel value is mapped, in a line connecting the center of each two-dimensional (2D) pixel region. In other words, if a pixel value is mapped to a top center of each pixel region, the result 220 of the cubic interpolation technique is formed to pass through the top center of each pixel region. When an image is enlarged, the cubic interpolation technique may be effective in preserving values of existing pixels, but may not be effective in determining values of interpolated pixels. In other words, the image enlarged using the linear, quadratic, or cubic interpolation techniques may blur.

Such image blurring may be caused by the difference between a pixel value and an average value of interpolation data in each pixel region, for example. In other words, the image blurring may occur because an accumulated value of a pixel obtained after a pixel value of the pixel is multiplied by the interval 250 between pixels is different from an accumulated value of a corresponding interpolation result at the interval 250. This will be described in greater detail later with reference to FIGS. 3A through 3B.

In FIG. 2, a solid line indicates an interpolation result 210 according to an embodiment of the present invention. While the result 220 of the conventional interpolation technique passes through each pixel point 290, the interpolation result 210, according to the present embodiment, is not limited by the pixel point. Instead, the interpolation result 210 may be formed such that accumulated values in a pixel region are equal. In other words, the interpolation result 210 may be formed such that the accumulated value of a pixel and that of interpolation data in a pixel region are equal, for example. As described in greater detail above, the interpolation result 210, according to the present embodiment, may also be formed using conventional linear interpolation, quadratic interpolation or cubic interpolation techniques, for example. The interpolation result 210, according to the present embodiment, is different from a conventionally obtained interpolation result in that an accumulated value of a pixel and that of an interpolation result in a pixel region may be equal in the present embodiment. Here, the accumulated value of the pixel or that of the interpolation result may be calculated by the accumulative addition unit 120, for example.

Figure 3B:
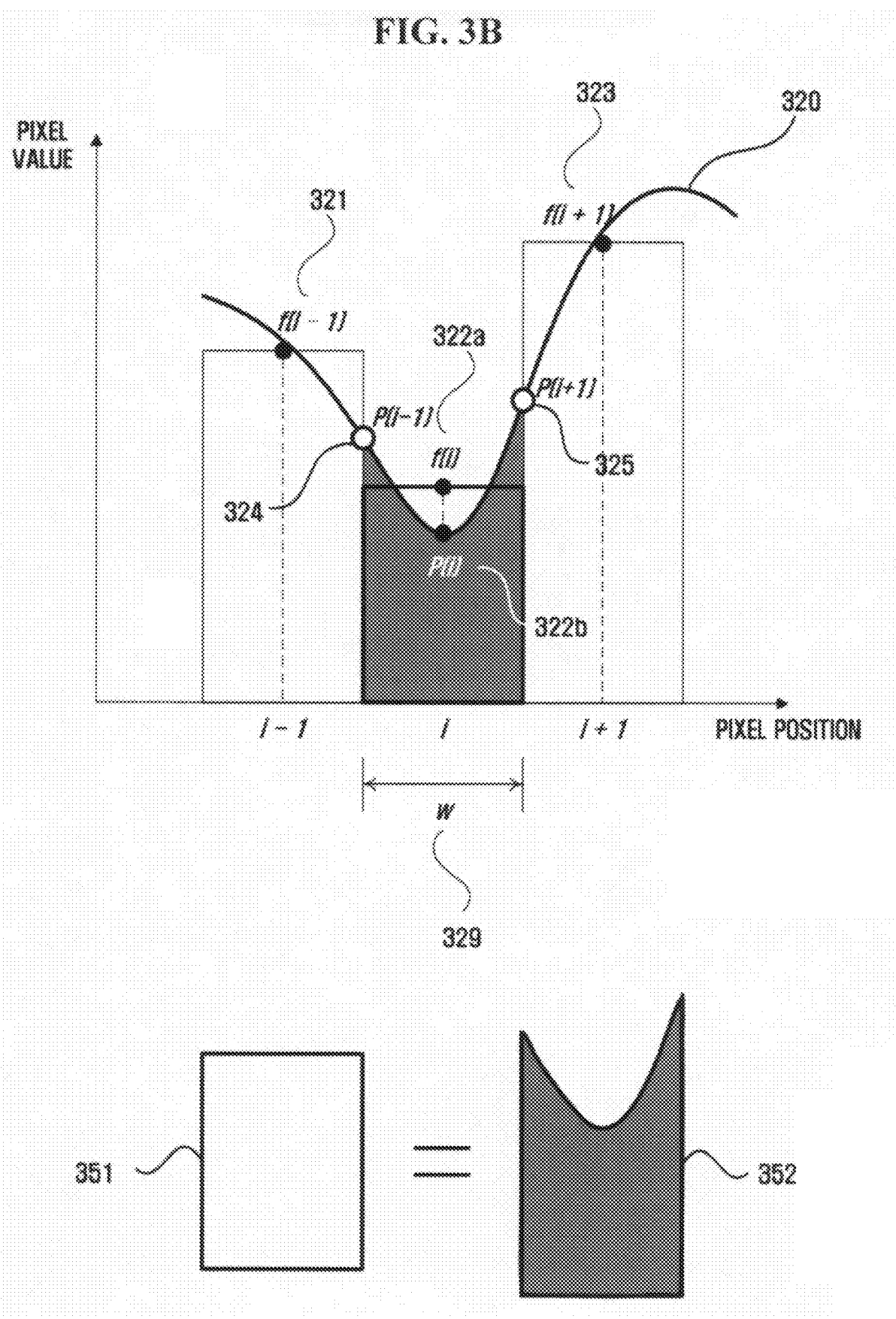

FIGS. 3A and 3B illustrate the result of a conventional interpolation technique and the result of an interpolation method according to an embodiment of the present invention, respectively.

As described above, if a series of pixels are arranged one-dimensionally, it may be assumed that the size of each pixel section is equal to an interval between pixels. In FIG. 3, the size of each pixel section corresponds to w 319, as an example.

In FIG. 3A, a curve 310, according to the conventional cubic interpolation technique, passes through pixel values 311 through 313, each of which is mapped to the top center of each pixel region. In other words, when an image is enlarged, values of existing pixels are preserved while values 314 and 315 of pixels inserted between the existing pixels are obtained by the graph 310.

FIG. 3B illustrates an interpolation graph 320 according to an embodiment of the present invention. The interpolation graph 320 may be formed such that an accumulated value of a pixel is equal to an accumulated value of the interpolation graph 320 regardless of pixel values 321, 322a and 323, mapped to respective pixel sections. In other words, the interpolation graph 320 may be formed such that the size of a bar graph formed by a pixel value, and that of a function formed by interpolation data in a pixel section, are equal. In FIG. 3B, since an interval between pixels, i.e., the size of a pixel section, is w 329, as an example, and a pixel value is f(i) 322a, also as an example, an accumulated value 351 of an $i^{th}$ pixel is w×f(i). In this case, if the graph 310 passes through a point f(i) (312) as illustrated in FIG. 3A, an accumulated value of the graph 310 is greater than that of a pixel. However, in FIG. 3B, an accumulated value 352 by the interpolation graph 320 in an i region is equal to the accumulated value 351 of the $i^{th}$ pixel.

Accordingly, when an image is enlarged, a pixel value in the i region is P(i) (322b), which is lower than f(i) (322a), a value of a pixel interpolated between an $(i-1)^{th}$ pixel and the $i^{th}$ pixel is P(i−1) (324), and a value of a pixel interpolated between the $i^{th}$ pixel and an $(i+1)^{th}$ pixel is P(i+1) (325).

In other words, while the conventional interpolation technique preserves values of existing pixels and does not preserve an average value of interpolation data existing in a pixel section after interpolation, the interpolation method according to the present embodiment may not preserve the values of the existing pixels but better preserves the average value of the interpolation data existing in the pixel section after the interpolation.

Therefore, when a conventional interpolation technique is used, an increase or decrease in pixel values between adjacent pixels affects interpolated pixels, which causes image blurring. However, when the interpolation method according to the present embodiment is used, such image blurring can be reduced.

Figure 4A:
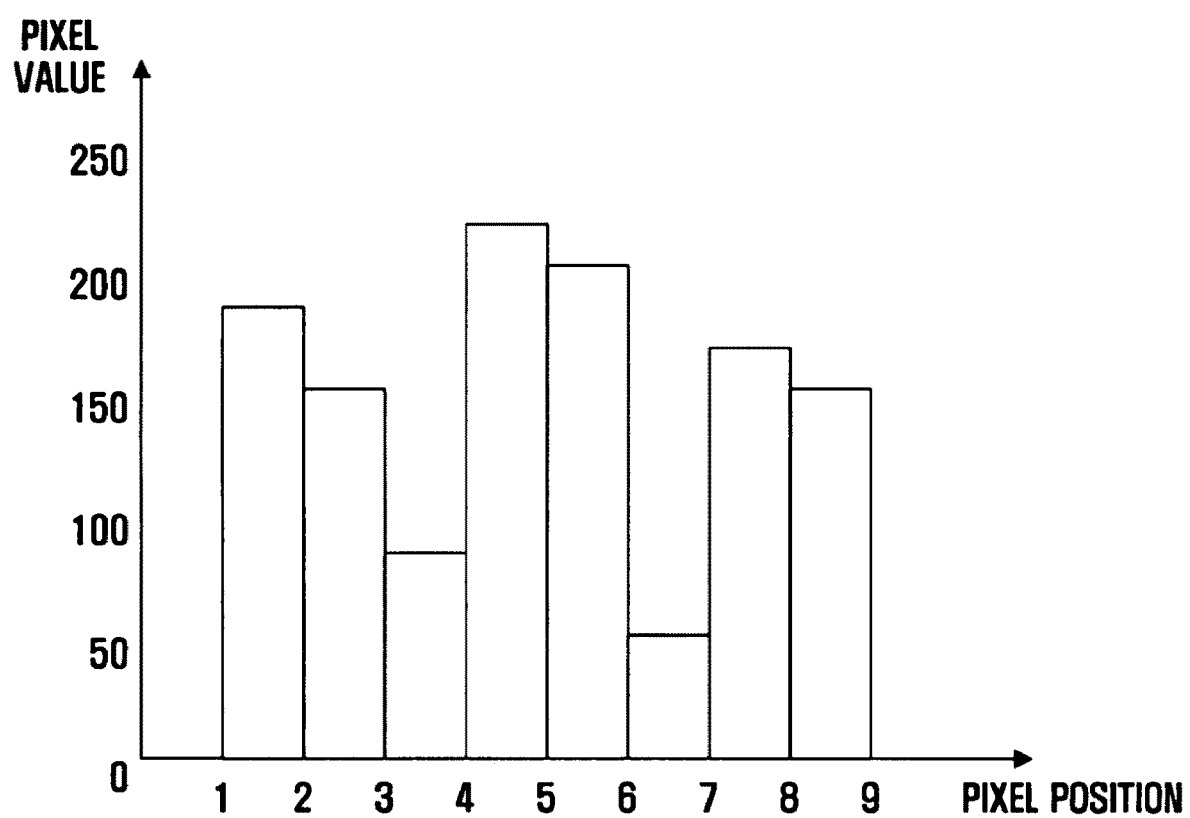
FIGS. 4A through 4E illustrate the process of forming an interpolation result, according to an embodiment of the present invention.

FIGS. 4A through 4E illustrate the process of forming an interpolation result according to an embodiment of the present invention. Specifically, FIG. 4A illustrates a series of pixels, each of which has a value of 0-255, and which are one-dimensionally arranged. Here, a pixel value corresponds to one dimension and thus is monochromatic. However, this is merely an example. One or more embodiments of the present invention may be applied to a color image. For example, in the case of an RGB image, if the present invention is applied to each of R, G and B, in a color image, in which an average value of interpolation data is preserved in a pixel region, color images may also be embodied.

Figure 4B:
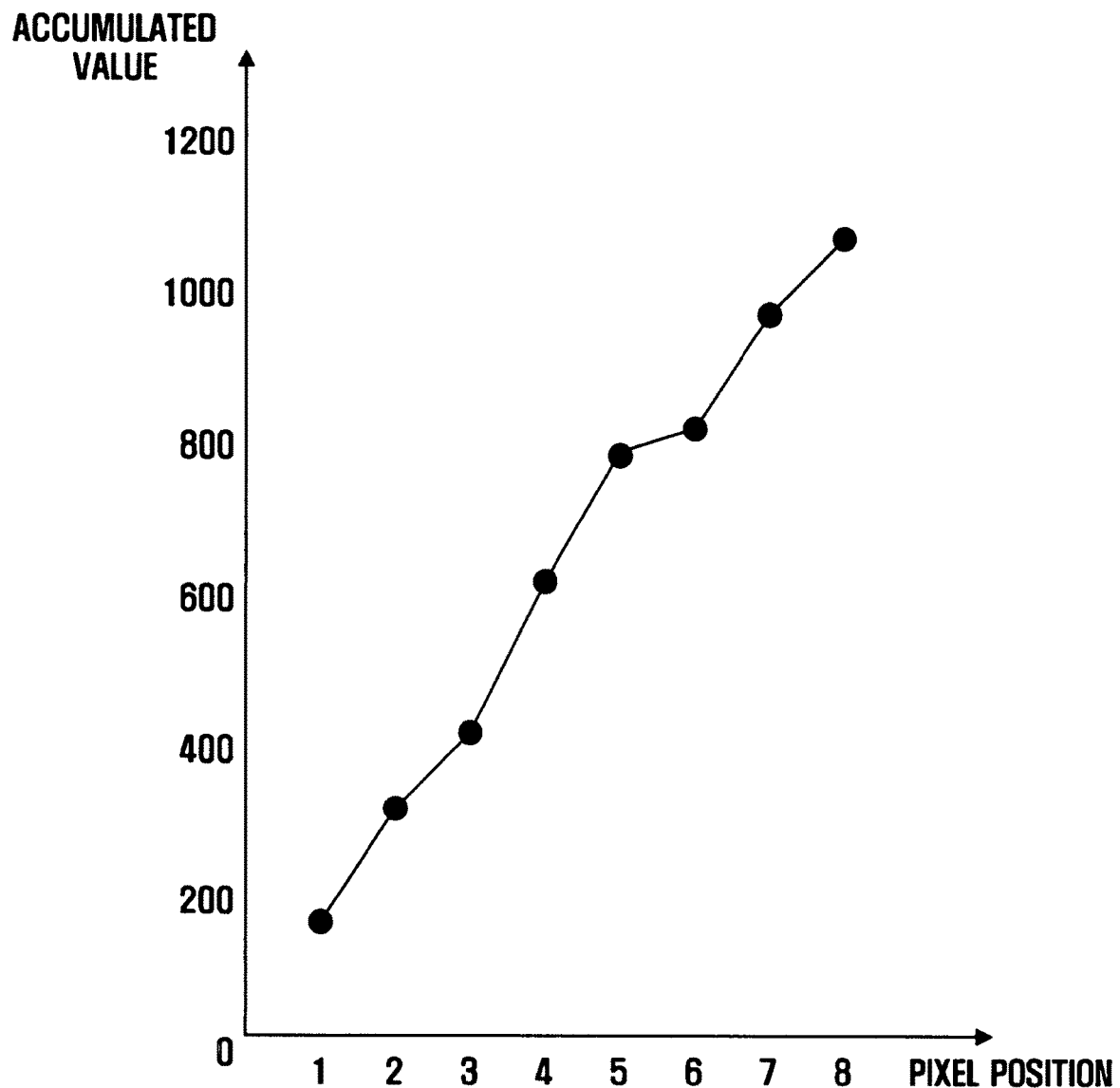
Figure 4C:
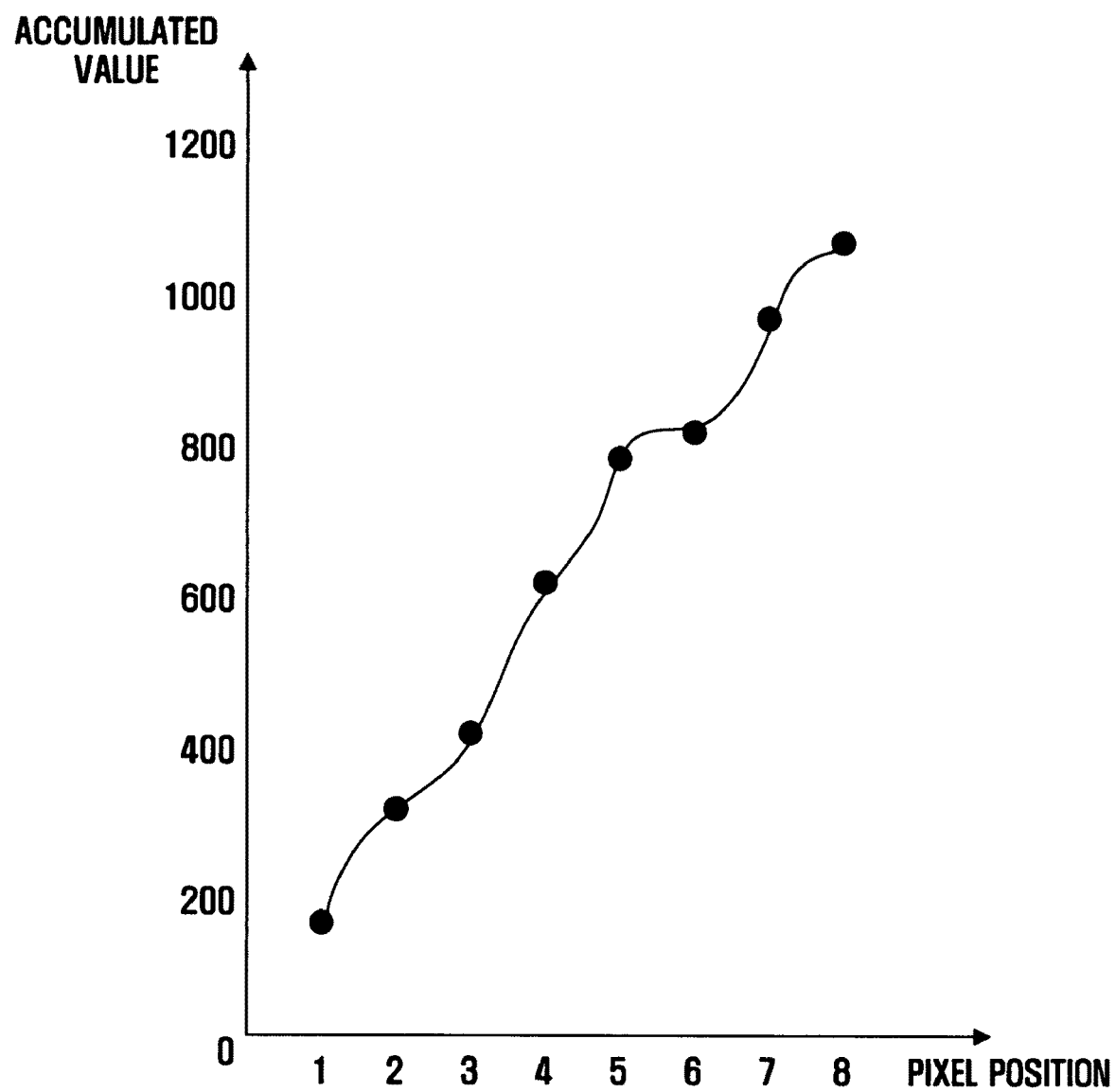

FIG. 4B illustrates accumulated values of pixels according to a pixel pattern of FIG. 4A. FIG. 4C is a graph illustrating an interpolation result formed based on the accumulated values of FIG. 4B. The interpolation result of FIG. 4C is formed such that an accumulated value of a pixel and that of interpolation data are equal in each pixel region.

Figure 4D:
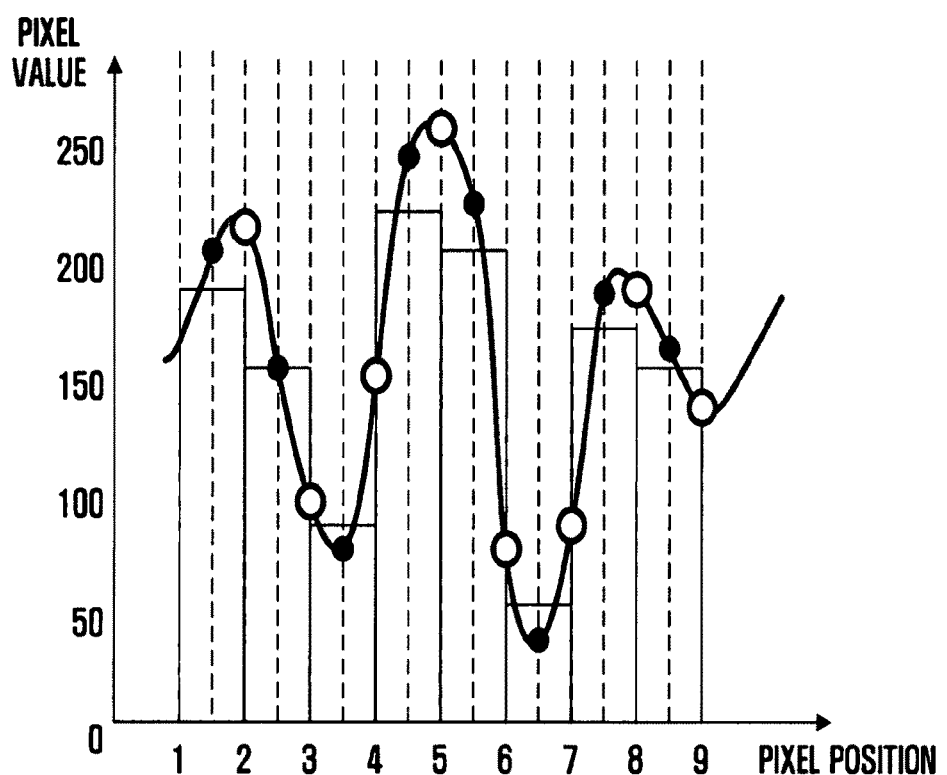
Figure 4E:
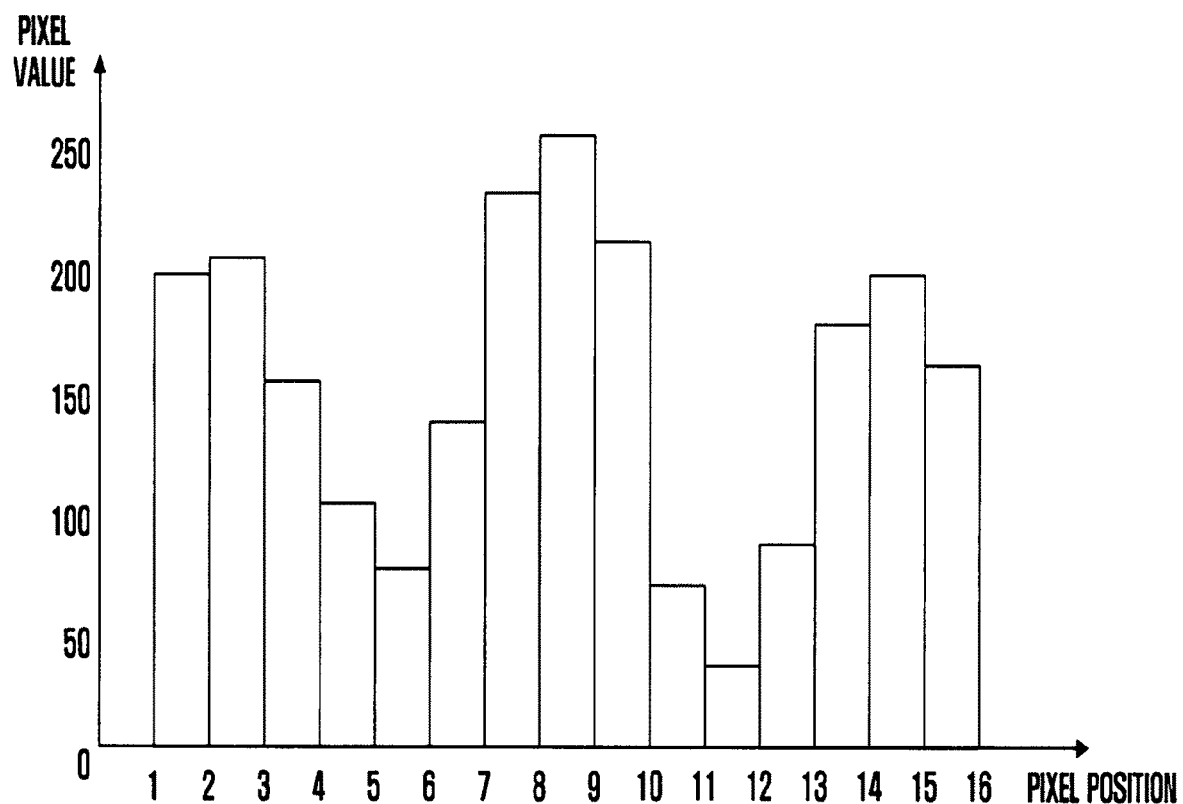

FIG. 4D is a graph illustrating an interpolation graph obtained after the graph of FIG. 4C is differentiated from the pixels of FIG. 4A. FIG. 4E illustrates pixels of an image enlarged based on the graph of FIG. 4D. A pixel value 441 of an interpolation graph passing through the center of a pixel region in an image before being enlarged and a pixel value 442 of an interpolation graph passing between adjacent pixels determines a value of a pixel in the enlarged image, which has been described above with reference to FIG. 3.

An interpolation graph, which makes an accumulated value of a pixel (hereinafter, referred to as a first accumulated value) and an accumulated value (hereinafter, referred to as a second accumulated value) of the interpolation graph become equal, may vary according to the form thereof. For example, referring to FIG. 5, a second accumulated value 515 when a slope of an interpolation graph 510 is gentle and a second accumulated value 525 when a slope of an interpolation value 520 is steep are equal. In other words, the quality of a restored image may vary according to the slope of an interpolation graph. The slope of the interpolation graph may be determined and input by a user.

Figure 6:
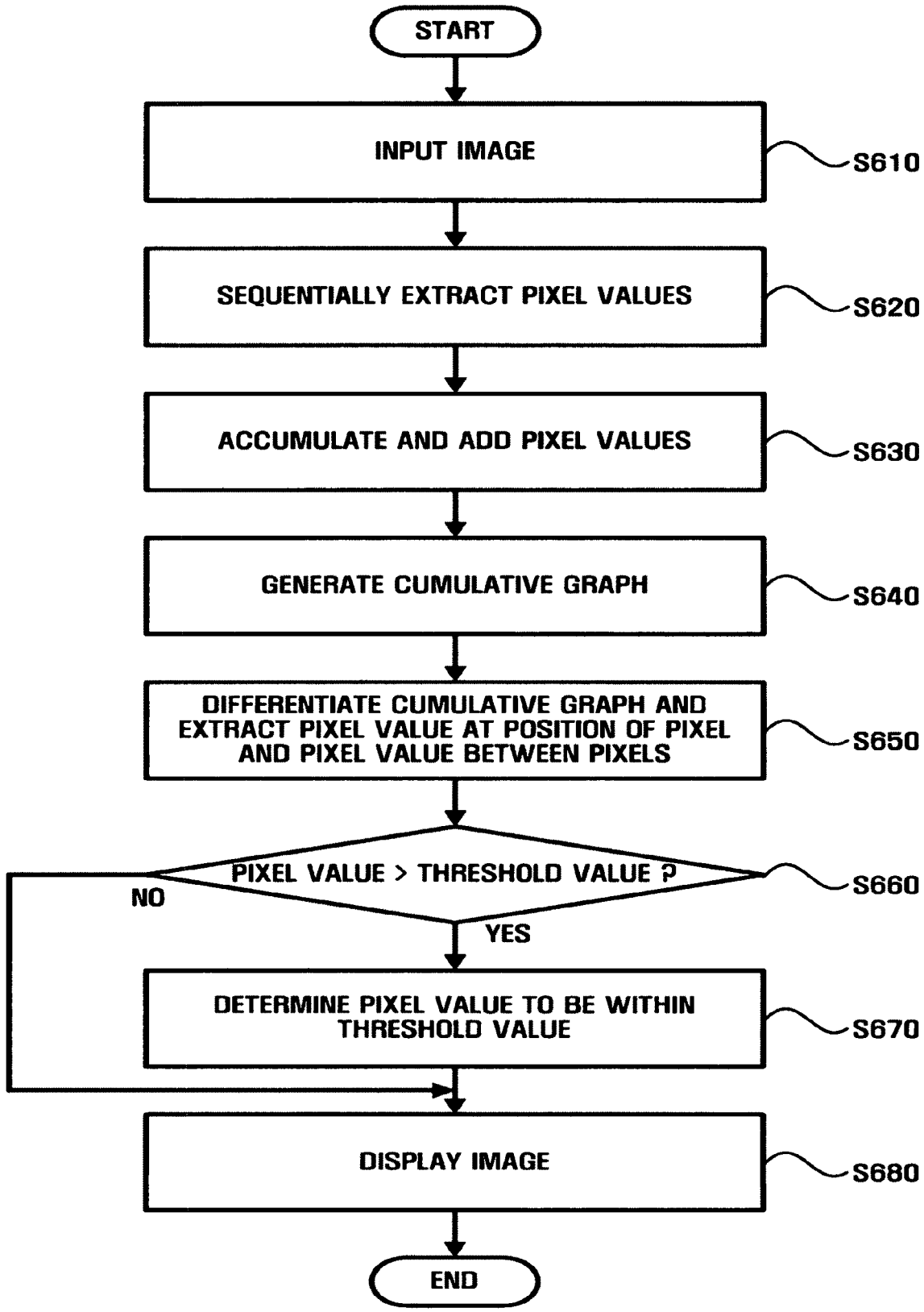
FIG. 6 illustrates an image processing method, according to an embodiment of the present invention.

FIG. 6 is a flowchart illustrating an image processing method, according to an embodiment of the present invention.

Referring to FIG. 6, the image input unit 160 of the image processing apparatus 100 may receive an image in operation S610. The input image may be a digital image, for example. An image of an additive color model or a subtractive color model may be input.

The input image may be transmitted to the pixel value extraction unit 110, and the pixel value extraction unit 110 may sequentially extract values of pixels included in the received image in operation S620. A pixel value may vary according to a color model of the image input to the image input unit 160. Therefore, the pixel value may include color intensity according to an RGB model, a CMYK model, a CIE LAB model, a CIE XYZ model, or a CIE LUV model, as examples.

The extracted pixel values may be transmitted to the accumulative addition unit 120, and the accumulative addition unit 120 may accumulate and add the received pixel values in operation S630. The pixel values accumulated by the accumulative addition unit 120 may be temporarily stored in the storage unit 170, and the interpolation unit 130 may interpolate the pixel values stored in the storage unit 170 using a predetermined interpolation method, for example, in operation S640. Here, the interpolation unit 130 may perform interpolation after all pixel values of an image for one frame are stored in the storage unit 170 or whenever a pixel value is accumulated.

The predetermined interpolation method used by the interpolation unit 130 may be a linear interpolation technique, a quadratic interpolation technique, a cubic interpolation technique, a Gaussian interpolation technique, a neural network interpolation technique, or a support vector machine interpolation technique, as examples.

The interpolation result of the interpolation unit 130 may be transmitted to the accumulative subtraction unit 140, and the accumulative subtraction unit 140 may perform differentiation at a predetermined position of the integration result in operation S650. Pixel values extracted after the differentiation may exceed a predetermined threshold range. Therefore, the accumulative subtraction unit 140 may identify whether the extracted pixel values exceed the threshold range in operation S660 and may determine pixel values exceeding the threshold range to be within the threshold range in operation S670.

The pixel values extracted by the accumulative subtraction unit 140 may be temporarily stored in the storage unit 170, and, after the extraction of pixel values based on the interpolation result is completed, the image output unit 180 may display the image in operation S680.

Figure 7B:
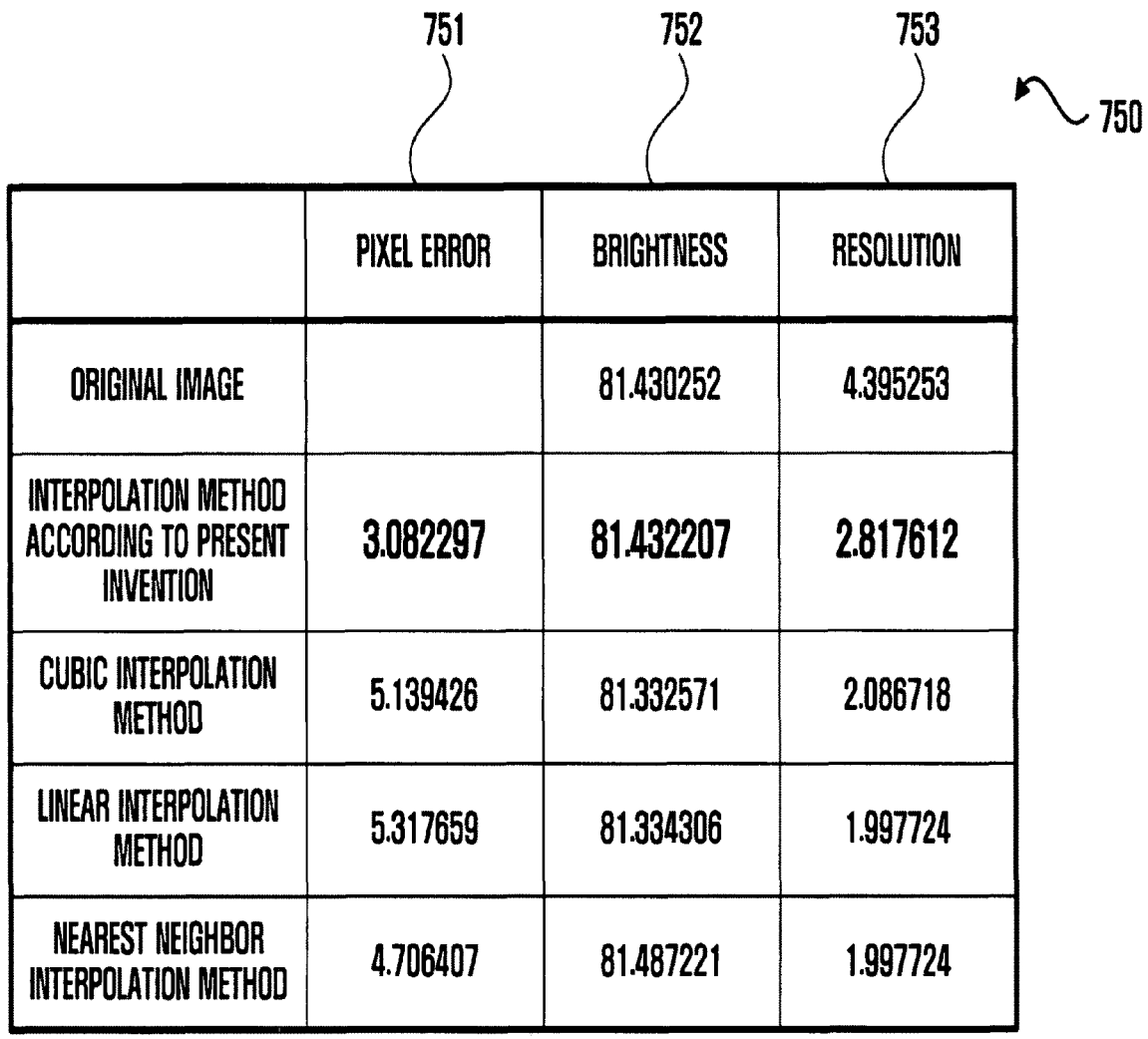

FIGS. 7A through 7C illustrate an image processed, according to an embodiment of the present invention and the results of processing the image.

In this experiment, an original image 700 was reduced to an experimental image 705 using the linear interpolation technique. Then, the experimental image 705 was interpolated using the interpolation method according to an embodiment of the present invention, the nearest neighbor interpolation technique, the linear interpolation technique, and the cubic interpolation technique to generate enlarged images 710 through 740, respectively. Finally, the difference between the original image 700 and each of the enlarged images 710 through 740 was calculated.

Referring to FIG. 7A, image blurring is apparent in the enlarged images 730 and 740 generated using the linear interpolation technique and the cubic interpolation technique, and a blocking phenomenon can be found in the enlarged image 720 generated using the nearest neighbor interpolation technique. However, blurring and blocking phenomena are less apparent in the enlarged image 710 generated using the interpolation method according to the embodiment of the present invention, than in the enlarged images 720 through 740 generated using the linear interpolation technique, the cubic interpolation technique and the nearest neighbor interpolation technique.

FIG. 7B is a table 750 numerically showing the experimental result of FIG. 7A. The table 750 includes a pixel error 751, brightness 752, and resolution 753, as examples.

The pixel error 751 is obtained after pixels included in an original image and those in an enlarged image are compared one to one and the difference between the pixels in the original and enlarged images is calculated. The smaller the value of the pixel error, the closer the enlarged image is to the original image. It can be understood from the table 750 that the enlarged image 710 generated using the interpolation method according to the embodiment of the present invention has less pixel error than the enlarged images 720 through 740 generated using the conventional interpolation techniques.

In the brightness 752, the brightness of an original image and that of an enlarged image are compared. As the brightness of the enlarged image is closer to that of the original image, the enlarged image is more similar to the original image. It can be understood from the table 750 that the difference between the brightness of the enlarged image 710 generated using the interpolation method according to the embodiment of the present invention and that of the original image 700 is less than the differences between the brightness of the enlarged images 720 through 740 generated using the conventional interpolation techniques and that of the original image 700.

In the resolution 753, the resolution of an original image is compared with that of an enlarged image. As the resolution of the enlarged image is closer to that of the original image, the enlarged image is more similar to the original image. It can be understood from the table 750 that the difference between the resolution of the enlarged image 710 generated using the interpolation method according to the embodiment of the present invention and that of the original image 700 is less than the differences between the resolution of the enlarged images 720 through 740 generated using the conventional interpolation techniques and that of the original image 700.

FIG. 7C illustrates graphs 791 through 793 representing values of a series of pixels selected from pixels included in the enlarged image 740 generated using the cubic interpolation technique in the experiment of FIG. 7A, the enlarged image 710 generated using the interpolation method according to the embodiment of the present invention, and the original image 700 in the experiment of FIG. 7A.

Referring to FIG. 7C, the graph 792 of the enlarged image 710 generated using the interpolation method according to the embodiment of the present invention is positioned closer to the graph 791 of the original image 700 than the graph 793 of the enlarged image 740 generated using the cubic interpolation technique.

FIGS. 8A through 8F illustrates an image processed according to an embodiment of the present invention and the process of processing the image.

Figure 8A:
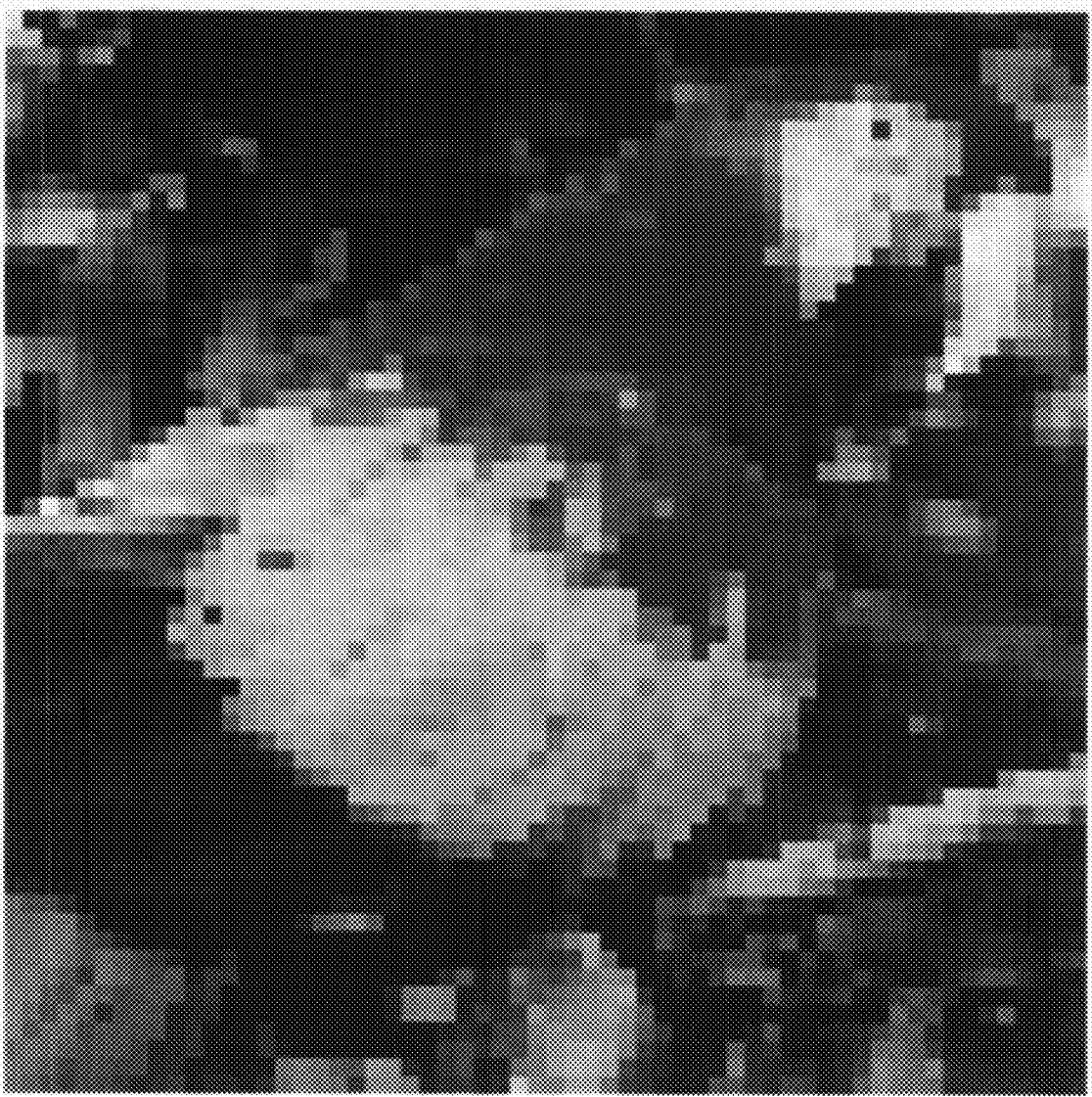
Figure 8B:
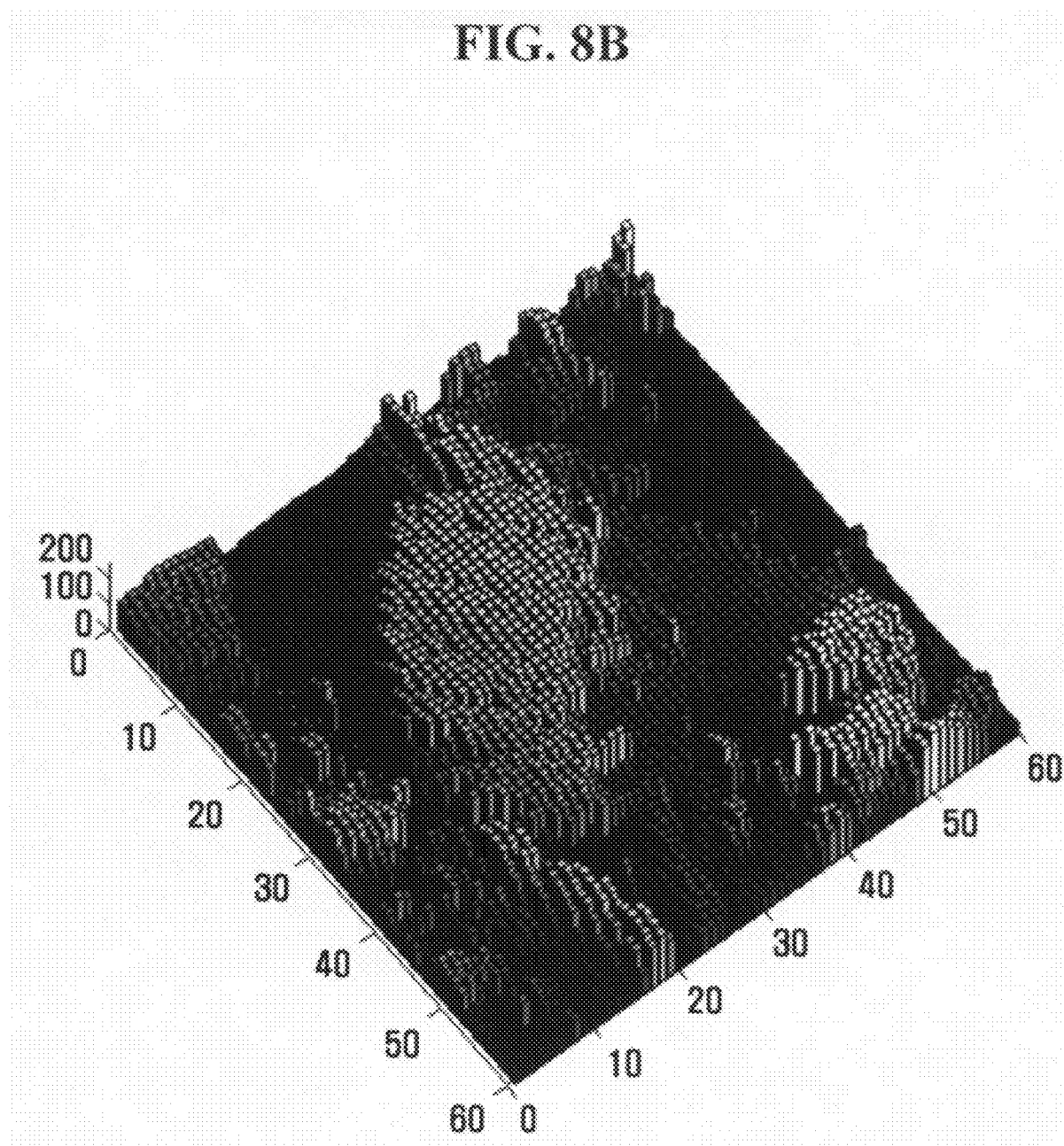
Figure 8E:
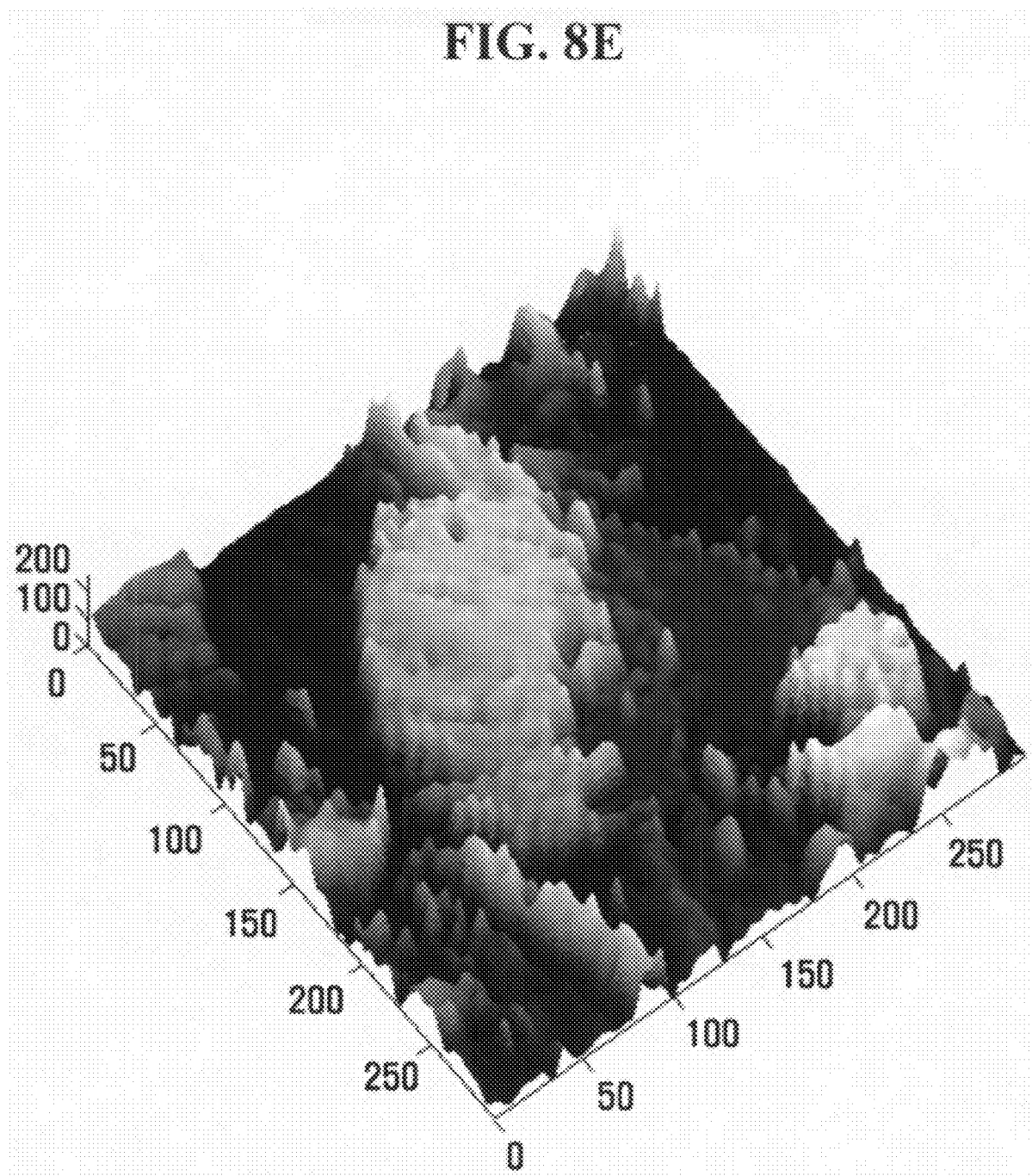
Figure 8F:
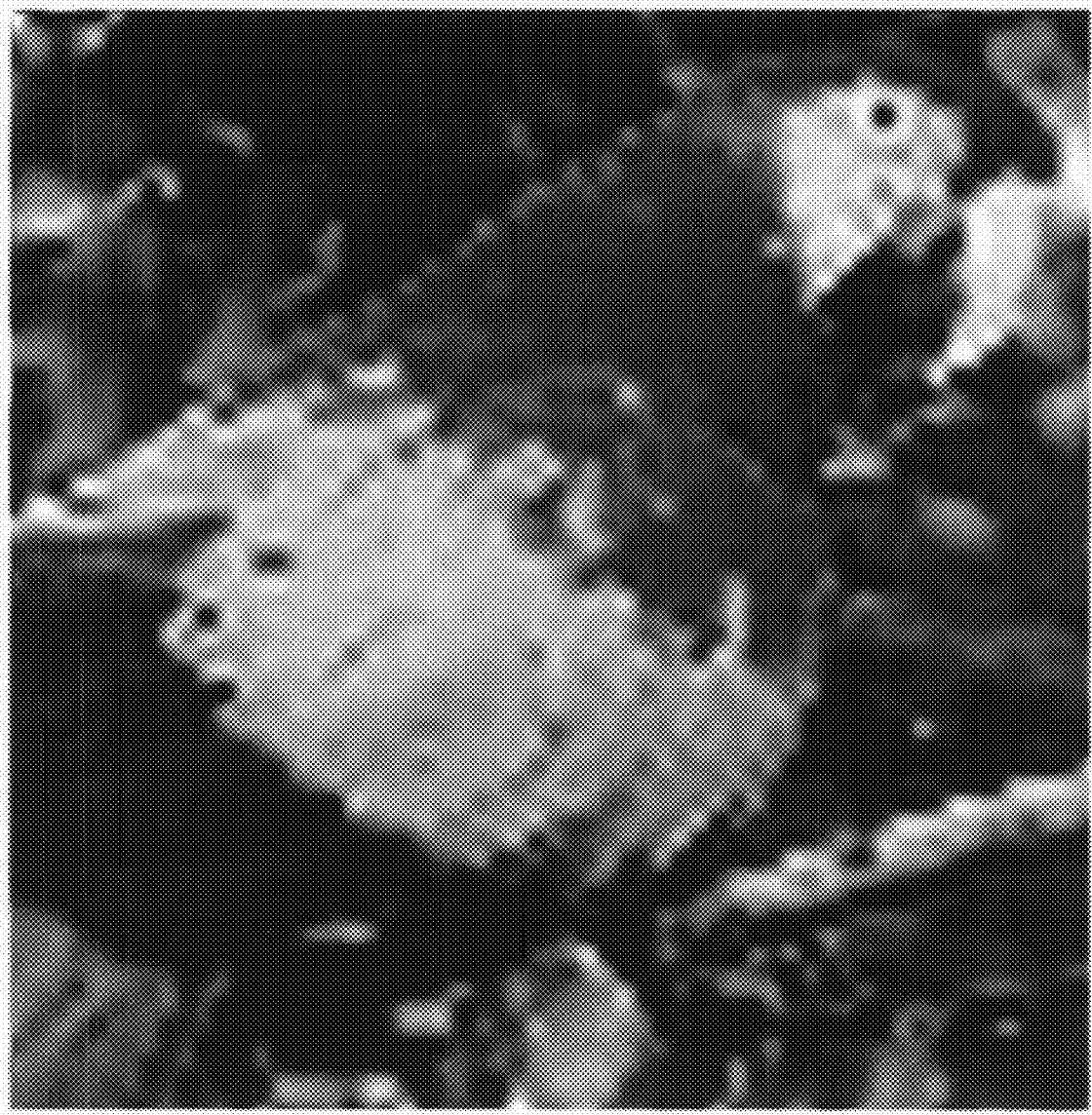

FIG. 8A illustrates an image before being interpolated. The image has pixel values as illustrated in FIG. 8B. If the image is converted according to the present embodiment, the converted image may be illustrated as in FIG. 8C. The interpolation result of FIG. 8C is illustrated in FIG. 8D. If FIG. 8D is reversely converted according to the present embodiment, FIG. 8E can be obtained. Accordingly, the image of FIG. 8A is converted into an image of FIG. 8F and is output accordingly.

It will be understood that each block in block diagrams, and combinations of blocks in flowchart illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create techniques for implementing the functions specified in each block of the block diagrams or each flowchart block of the flowchart illustrations.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in each block of the block diagrams, or each flowchart block of the flowchart illustrations.

The computer program instructions may also be loaded onto a computer or other programmable data processing apparatus to cause a series of operations to be performed on the computer or other programmable apparatus to produce a computer implemented process such that the instructions that execute on the computer or other programmable apparatus implement the functions specified in each block of the block diagrams or each flowchart block of the flowchart illustrations.

Further, each block or each flowchart block may represent a module, segment, or portion of code, which comprises one or more executable instructions for implementing the specified logical function(s). It should also be noted that in some alternative implementations, the functions noted in the blocks or flowchart blocks may occur out of the order. For example, two blocks or flowchart blocks shown in succession may in fact be executed substantially concurrently. Alternatively, the blocks or flowchart blocks may sometimes be executed in the reverse order, depending upon the functionality involved.

In addition to this discussion, one or more embodiments of the present invention may also be implemented through computer readable code/instructions in/on a medium, e.g., a computer readable medium, to control at least one processing element to implement any above described embodiment. The medium may correspond to any medium/media permitting the storing and/or transmission of the computer readable code.

The computer readable code may be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to one or more embodiments of the present invention. The media may also be a distributed network, so that the computer readable code is stored/transferred and executed in a distributed fashion.

As described above, an image processing apparatus and method according to the present invention performs interpolation such that a pixel value in each pixel region included in a digital image and an average value of interpolation data extracted using a predetermined interpolation method in the pixel region are equal. Therefore, the image processing apparatus and method may enlarge the digital image causing minimal blurring and without requiring significant computation.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image processing apparatus, comprising:
   an accumulative addition unit to sequentially integrate values of pixels included in an image;
   an interpolation unit to interpolate the integrated pixel values; and
   an accumulative subtraction unit to perform differentiation at a predetermined position of the interpolated pixel values.

2. The apparatus of claim 1, wherein the interpolation unit interpolates the integrated pixel values such that a pixel value in a region where a pixel exists and an accumulated value based on the interpolated pixel values in the region are equal.

3. The apparatus of claim 2, wherein the accumulative addition unit extracts the integrated values.

4. The apparatus of claim 1, wherein the interpolation unit interpolates the integrated values using one of a linear interpolation technique, a quadratic interpolation technique, a cubic interpolation technique, a Gaussian interpolation technique, a neural network interpolation technique, and a support vector machine interpolation technique.

5. The apparatus of claim 1, wherein the accumulative subtraction unit determines an extracted pixel value exceeding a threshold range to be within the threshold range.

6. The apparatus of claim 1, wherein the interpolation unit interpolates the integrated pixel values using a predetermined interpolation technique.

7. The apparatus of claim 1, wherein the accumulative addition unit sequentially integrates digital image data by accumulatively adding each pixel value.

8. The apparatus of claim 1, wherein the accumulative subtraction unit differentiates digital image data by accumulatively subtracting each pixel value.

9. An image processing method, comprising:
   using at least one processor to perform the steps of:
   sequentially integrating values of pixels included in an image;
   interpolating the integrated pixel values; and
   performing differentiation at a predetermined position of the interpolated pixel values.

10. The method of claim 9, wherein the interpolating of the integrated pixel values comprises interpolating the integration result such that a pixel value in a region where a pixel exists and an accumulated value based on the interpolated pixel values in the region are equal.

11. The method of claim 10, further comprising extracting the integrated values.

12. The method of claim 9, wherein the interpolating of the integrated values comprises interpolating the integration result using one of a linear interpolation technique, a quadratic interpolation technique, a cubic interpolation technique, a Gaussian interpolation technique, a neural network interpolation technique, and a support vector machine interpolation technique.

13. The method of claim 9, wherein the performing differentiation comprises determining an extracted pixel value exceeding a threshold range to be within the threshold range.

14. The method of claim 9, wherein the interpolating the integrated pixel values is performed using a predetermined interpolation technique.

15. The method of claim 9, wherein the sequential integration is performed for digital image data by accumulatively adding each pixel value.

16. The method of claim 9, wherein the differentiation is performed for digital data by accumulatively subtracting each pixel value.

17. At least one non-transitory medium comprising computer readable code to control at least one processing element to implement an image interpolation method, the method comprising:
sequentially integrating values of pixels included in an image;
interpolating the integrated pixel values; and
performing differentiation at a predetermined position of the interpolated pixel values.

18. The medium of claim 17, wherein the interpolating comprises interpolating the integrated pixel values such that a pixel value in a region where a pixel exists and an accumulated value based on the interpolation result in the region are equal.

19. The medium of claim 18, further comprising extracting the integrated values.

20. The medium of claim 17, wherein the interpolating of the integration result comprises interpolating the integration result using one of a linear interpolation technique, a quadratic interpolation technique, a cubic interpolation technique, a Gaussian interpolation technique, a neural network interpolation technique, and a support vector machine interpolation technique.

21. The medium of claim 17, wherein the performing differentiation comprises determining an extracted pixel value exceeding a threshold range to be within the threshold range.

22. The medium of claim 17, wherein the interpolating the integrated pixel values is performed using a predetermined interpolation technique.

23. The medium of claim 17, wherein the sequential integration is performed for digital image data by accumulatively adding each pixel value.

24. The medium of claim 17, wherein the differentiation is performed for digital data by accumulatively subtracting each pixel value.

* * * * *